US008438561B2

(12) United States Patent
Itoh

(10) Patent No.: US 8,438,561 B2
(45) Date of Patent: May 7, 2013

(54) MEDIATION APPARATUS, INSTALLATION SYSTEM, INSTALLATION METHOD, AND INSTALLATION PROGRAM

(75) Inventor: Akinori Itoh, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 315 days.

(21) Appl. No.: 13/014,221

(22) Filed: Jan. 26, 2011

(65) Prior Publication Data

US 2011/0202912 A1 Aug. 18, 2011

(30) Foreign Application Priority Data

Feb. 16, 2010 (JP) ................................. 2010-031345

(51) Int. Cl.
G06F 9/44 (2006.01)
G06F 9/445 (2006.01)
G06F 21/00 (2006.01)
G06F 17/30 (2006.01)

(52) U.S. Cl.
USPC ................. 717/177; 705/59; 726/26; 726/28

(58) Field of Classification Search ........................ None
See application file for complete search history.

(56) References Cited

U.S. PATENT DOCUMENTS

| | | |
|---|---|---|
| 2004/0133626 A1 | 7/2004 | Herrero et al. |
| 2006/0085354 A1* | 4/2006 | Hirai .............................. 705/59 |
| 2007/0107067 A1 | 5/2007 | Fountian |
| 2008/0109799 A1* | 5/2008 | Imamura ........................ 717/168 |
| 2008/0148412 A1* | 6/2008 | Okada ............................ 726/28 |
| 2008/0208754 A1* | 8/2008 | Zunke et al. .................... 705/59 |
| 2009/0201547 A1* | 8/2009 | Noguchi et al. ............. 358/1.15 |
| 2010/0071069 A1* | 3/2010 | Sugiura et al. ................. 726/26 |

(Continued)

FOREIGN PATENT DOCUMENTS

| | | |
|---|---|---|
| EP | 1 965 330 A2 | 9/2008 |
| JP | 2004-118237 | 4/2004 |
| JP | 2004-139149 | 5/2004 |

OTHER PUBLICATIONS

Francisco Vilar Brasileiro et al., "Bouncer: A Robust and Flexible License Management Service for Avoiding Illegal Use of Software" [Online], pp. 1-15, [Retrived from Internet on Jan. 13, 2013], <http://citeseerx.ist.psu.edu/viewdoc/download?doi=10.1.1.28.2987&rep=rep1&type=pdf>.*

(Continued)

Primary Examiner — Thuy Dao
Assistant Examiner — Ziaul A Chowdhury
(74) Attorney, Agent, or Firm — Oblon, Spivak, McClelland, Maier & Neustadt, L.L.P.

(57) ABSTRACT

A receiving section receives an installation request including a validation date and time when a license of a plug-in is validated from a management apparatus. A license key acquiring section acquires a license key of the plug-in by requesting temporary issue thereof from a license server prior to the activation date and time. A plug-in acquiring section acquires the plug-in by requesting distribution thereof from a plug-in server prior to the validation date and time. A license key acquisition determining section determines whether the license key of the plug-in can be acquired from the license server at the time when the validation date and time has passed. An installing unit causes a multifunction peripheral to install therein the plug-in by using the temporarily issued license key and the plug-in when it is determined that the license key cannot be acquired.

9 Claims, 8 Drawing Sheets

U.S. PATENT DOCUMENTS

| | | | |
|---|---|---|---|
| 2010/0251232 A1* | 9/2010 | Shinomiya | 717/177 |
| 2010/0293491 A1* | 11/2010 | Kawai | 715/771 |
| 2011/0041125 A1* | 2/2011 | Sugiura | 717/176 |
| 2011/0061047 A1* | 3/2011 | Tyamagondlu et al. | 717/177 |
| 2011/0067023 A1* | 3/2011 | Chiyo et al. | 717/177 |

OTHER PUBLICATIONS

G. Myles et al., "Content protection for games", [Online], IBM Jaurnal, 2006, pp. 119-143, [Retrieved from Internet on Jan. 13, 2013], <http://citeseerx.ist.psu.edu/viewdoc/download?doi=10.1.1.89.3786&rep=rep1&type=pdf>.*

Kenneth J. Rodriguez, "Closing the Door on Open Source: Can the General Public License Save Linux and Other Open Source Software?", [Online], 2005, pp. 403-418, [Retrieved from Internet on Jan. 13, 2013], <http://www.jhtl.org/docs/pdf/10_JHTL_Rodriguez_note.pdf>.*

Mikko Va'lima"ki et al., "The impact of free and open source licensing on operating system software markets", [Online], Jun. 2004, pp. 97-110, [Retrieved from Internet on Jan. 13, 2013], <http://140.118.5.28/MIS_Notes/artpresent/MIS2_%E9%9B%BB%E5%AD%90%E6%AA%94/1.pdf>.*

Extended European Search Report issued Jul. 22, 2011, in European Patent Application No. 11250075.6.

IBM Corporation: "Netview Distribution Manager for MVS. General Information. Release 7.", vol. GH19-6792-06, XP-55002637, Oct. 2000, pp. I-XVIII and 1-72.

* cited by examiner

FIG. 3

| DEVICE ID | PLUG-IN ID | LICENSE VALIDATION DATE AND TIME | LICENSE INVALIDATION DATE AND TIME |
|---|---|---|---|
| 101 | 01234 | 2009/09/1 0:00 | 2010/09/1 0:00 |
| 101 | 56789 | 2009/10/1 0:00 | 2010/10/1 0:00 |
| 102 | 01234 | 2009/11/1 0:00 | 2010/11/1 0:00 |

FIG. 4

| DEVICE ID | PLUG-IN ID | LICENSE KEY |
|---|---|---|
| 101 | 01234 | LICENSE KEY 1 |
| 102 | 01234 | LICENSE KEY 2 |

FIG. 7

| MEDIATION APPARATUS ID | DEVICE ID | PLUG-IN ID | LICENSE VALIDATION DATE AND TIME | LICENSE INVALIDATION DATE AND TIME |
|---|---|---|---|---|
| 200 | 101 | 01234 | 2009/09/1 0:00 | 2010/09/1 0:00 |
| 200 | 101 | 56789 | 2009/10/1 0:00 | 2010/10/1 0:00 |
| 200 | 102 | 01234 | 2009/11/1 0:00 | 2010/11/1 0:00 |
| 3000 | 2001 | 01234 | 2009/10/1 0:00 | 2010/10/1 0:00 |
| 3000 | 2002 | 56789 | 2009/09/1 0:00 | 2010/09/1 0:00 |
| 3000 | 2003 | 55555 | 2009/05/1 0:00 | 2010/11/1 0:00 |
| 4000 | 3001 | 33333 | 2009/05/1 0:00 | 2010/11/1 0:00 |

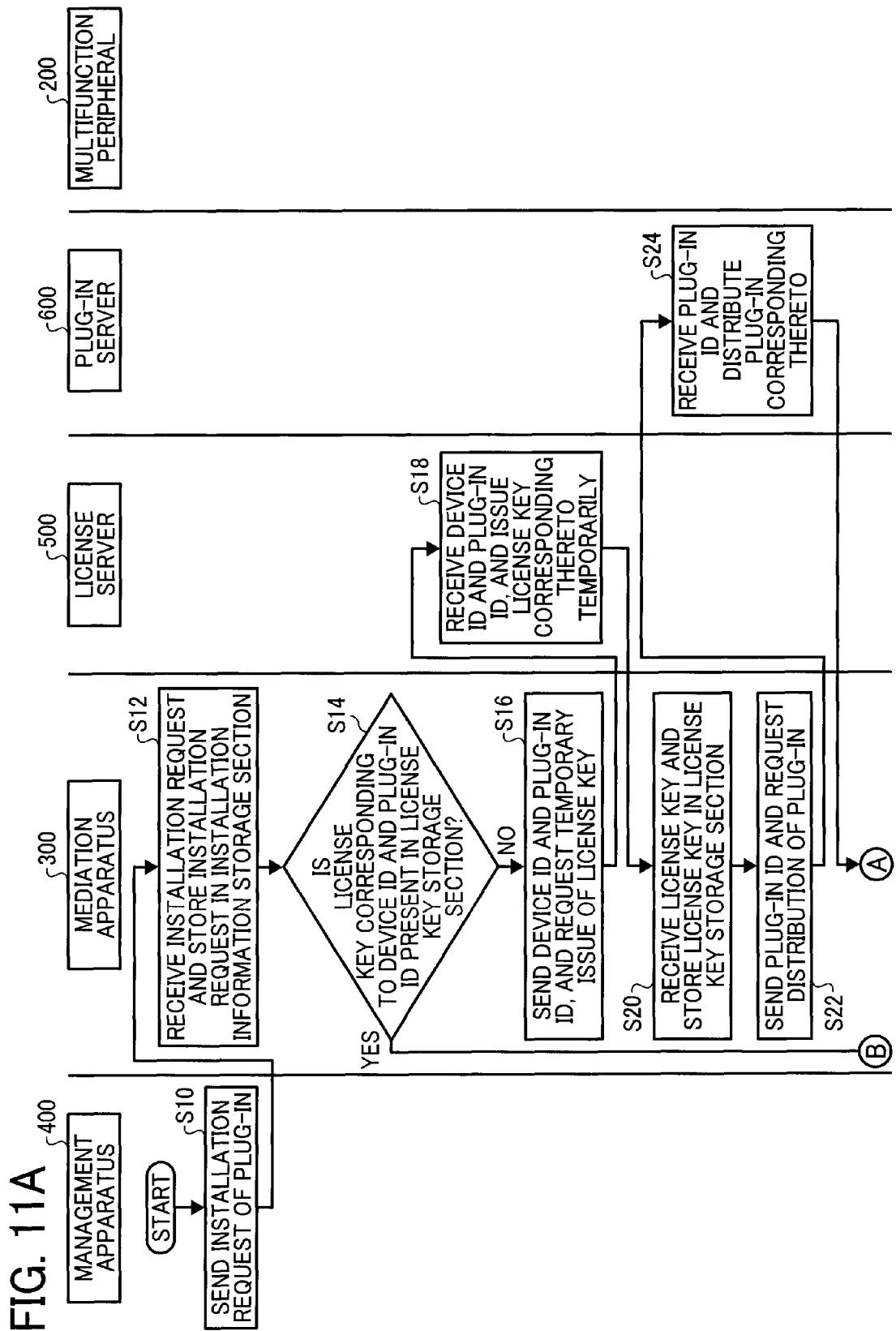

MEDIATION APPARATUS, INSTALLATION SYSTEM, INSTALLATION METHOD, AND INSTALLATION PROGRAM

CROSS-REFERENCE TO RELATED APPLICATIONS

The present application claims priority to and incorporates by reference the entire contents of Japanese Patent Application No. 2010-031345 filed in Japan on Feb. 16, 2010.

BACKGROUND OF THE INVENTION

1. Field of the Invention

The present invention relates to a mediation apparatus, an installation system, an installation method, and an installation program.

2. Description of the Related Art

In recent years, image forming apparatuses, such as digital copying machines and multifunction peripherals, have been required to provide customizable functions depending on preferences and purposes of users. In a known system for managing addition and deletion of the functions to and from such image forming apparatuses, a management apparatus manages a state of software such as a plug-in for each of a plurality of image forming apparatuses (valid or invalid, for example) via a mediation apparatus.

For example, Japanese Patent Application Laid-open No. 2004-139149 discloses a technology in which license management of computer programs executable in a peripheral device, such as an image forming apparatus, is performed by using a database that dynamically manages an ID of a license file including the computer program ID and the usable amount of the computer programs so as to manage the right of use of the computer program for the peripheral device.

In the conventional technologies as described above, software to be installed and a license key of the software are acquired from a server usually at a scheduled time when the software is installed. As a result, if a failure occurs in the server or a network at the scheduled time for the installation, the software to be installed cannot be installed at the scheduled time.

In view of the circumstances described above, there is a need to provide a mediation apparatus, an installation system, an installation method, and an installation program, by which software to be installed can be installed at a scheduled time even if a failure occurs in a server or a network.

SUMMARY OF THE INVENTION

It is an object of the present invention to at least partially solve the problems in the conventional technology.

One aspect of the invention relates to a mediation apparatus. The mediation apparatus is connected, via a network, to an image forming apparatus, a management apparatus that manages installation of software in the image forming apparatus, a license server that issues a license key of the software, and a software sever that distributes the software. The mediation apparatus comprises a receiving unit that receives, from the management apparatus, an installation request including a validation date and time when a license of the software is validated, and stores the installation request in an installation information storage unit; a license key acquiring unit that acquires the license key by requesting temporary issue thereof from the license server prior to the validation date and time, and stores the license key in a license key storage unit; a software acquiring unit that acquires the software by requesting distribution thereof from the software server prior to the validation date and time, and stores the software in a software storage unit; a license key acquisition determining unit that determines whether the license key is acquirable from the license server at the time when the validation date and time has passed; and an installing unit that causes the image forming apparatus to install therein the software by using the license key stored in the license key storage unit and the software stored in the software storage unit when it is determined that the license key is not acquirable.

Another aspect of the invention relates to an installation method. The installation method is executed by a mediation apparatus connected, via a network, to an image forming apparatus, a management apparatus that manages installation of software in the image forming apparatus, a license server that issues a license key of the software, and a software sever that distributes the software. The installation method comprises receiving, by a receiving unit, an installation request including an validation date and time when a license of the software is validated from the management apparatus to store the installation request in an installation information storage unit; acquiring, by a license key acquiring unit, the license key by requesting temporary issue thereof from the license server prior to the validation date and time to store the license key in a license key storage unit; acquiring, by a software acquiring unit, the software by requesting distribution thereof from the software server prior to the validation date and time to store the software in a software storage unit; determining, by a license key acquisition determining unit, whether the license key is acquirable from the license server at the time when the validation date and time has passed; and installing, by an installing unit, the software in the image forming apparatus by using the license key stored in the license key storage unit and the software stored in the software storage unit when it is determined that the license key is not acquirable.

Still another aspect of the invention is directed to a computer program product. The program product has a program including instructions for causing a computer to execute an installation by a mediation apparatus connected, via a network, to an image forming apparatus, a management apparatus that manages installation of software in the image forming apparatus, a license server that issues a license key of the software, and a software sever that distributes the software. The instructions comprises receiving, by a receiving unit, an installation request including an validation date and time when a license of the software is validated from the management apparatus to store the installation request in an installation information storage unit; acquiring, by a license key acquiring unit, the license key by requesting temporary issue thereof from the license server prior to the validation date and time to store the license key in a license key storage unit; acquiring, by a software acquiring unit, the software by requesting distribution thereof from the software server prior to the validation date and time to store the software in a software storage unit; determining, by a license key acquisition determining unit, whether the license key is acquirable from the license server at the time when the validation date and time has passed; and installing, by an installing unit, the software in the image forming apparatus by using the license key stored in the license key storage unit and the software stored in the software storage unit when it is determined that the license key is not acquirable.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic of an example of installation information.

FIG. 4 is a schematic of an example of information stored in a license key storage section.

FIG. 7 is a schematic of an example of an installation management table.

FIG. 11A is a flowchart illustrating an example of installation processing performed by the installation system according to the embodiment.

DETAILED DESCRIPTION OF THE PREFERRED EMBODIMENTS

Exemplary embodiments of a mediation apparatus, an installation system, an installation method, and an installation program according to the present invention are described below in greater detail with reference to the accompanying drawings.

The structure of the installation system according to the present embodiment will now be described.

Figure 1:
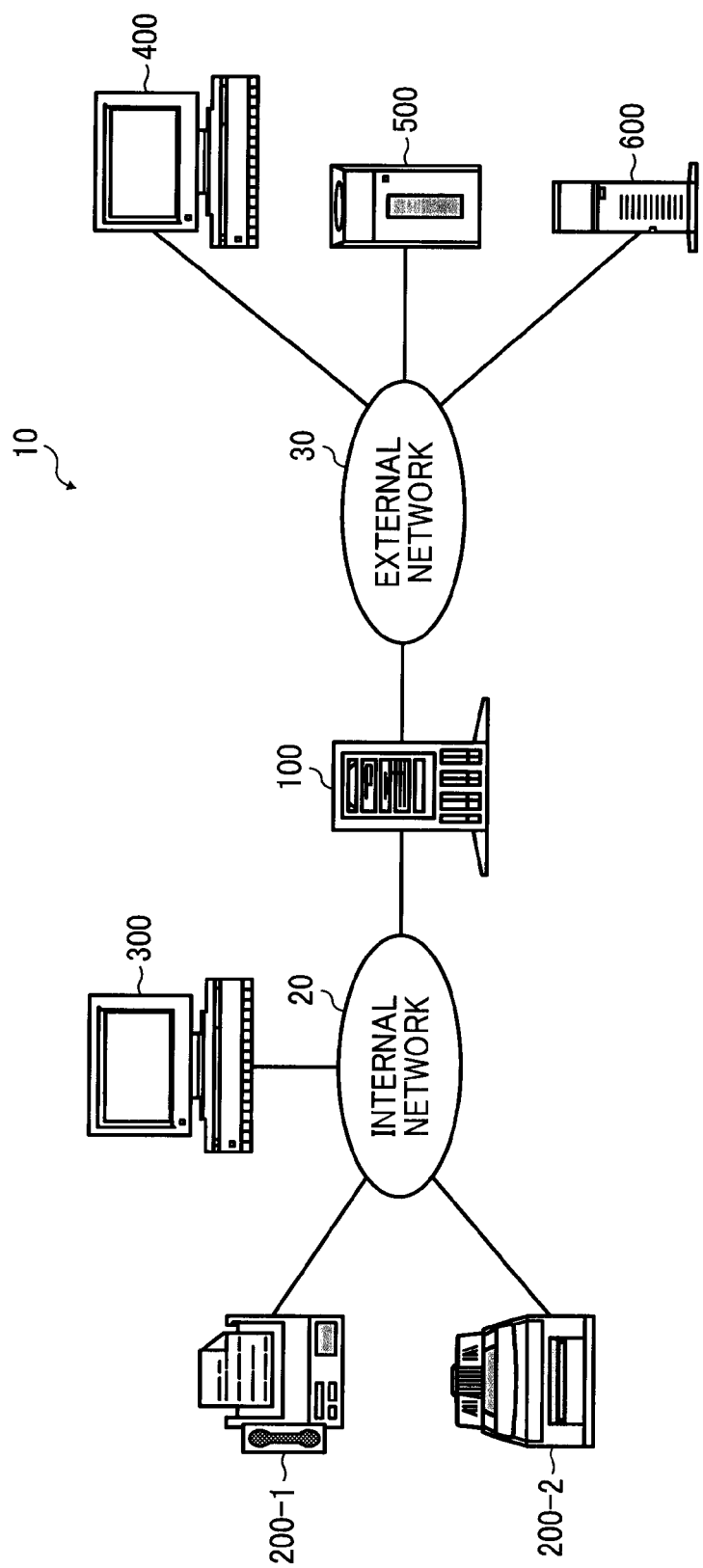
FIG. 1 is a schematic of an exemplary structure of an installation system according to an embodiment of the present invention.

FIG. 1 is a schematic of an exemplary structure of an installation system 10 according to the present embodiment. As illustrated in FIG. 1, the installation system 10 includes a firewall 100 (an example of a network), multifunction peripherals (MFP) 200-1 and 200-2 (examples of image forming apparatuses), a mediation apparatus 300, a management apparatus 400, a license server 500, and a plug-in server 600 (an example of a software server). The firewall 100, the MFPs 200-1 and 200-2, and the mediation apparatus 300 are connected via an internal network 20 (an example of a network), whereas the firewall 100, the management apparatus 400, the license server 500, and the plug-in server 600 are connected via an external network 30 (an example of a network). The internal network 20 can be realized by a local area network (LAN), and the external network 30 can be realized by a communication network such as a public network or the Internet, for example. When the MFPs 200-1 and 200-2 need not be distinguished below, they may be referred to as an MFP 200 simply.

The firewall 100, which maintains the security of the internal network 20, monitors the communications between the internal network 20 and the external network 30, and detects and blocks unauthorized accesses from the external network 30 to the internal network 20.

The MFP 200 is an apparatus having at least two functions among a copier function, a printer function, a scanner function, and a facsimile function. In the present embodiment, an MFP is described as an example of an image forming apparatus. However, the image forming apparatus is not limited thereto, and may be any one of copying machines, printers, scanner apparatuses, facsimile apparatuses or the like. Additionally, in the present embodiment, an example in which the number of MFPs is two is explained. However, the number of MFPs in not limited thereto, and may be one, or three or more.

The mediation apparatus 300 mediates between the MFP 200 and the management apparatus 400, the license server 500, and the plug-in server 600 to cause the MFP 200 to install therein a plug-in (an example of software).

Figure 2:
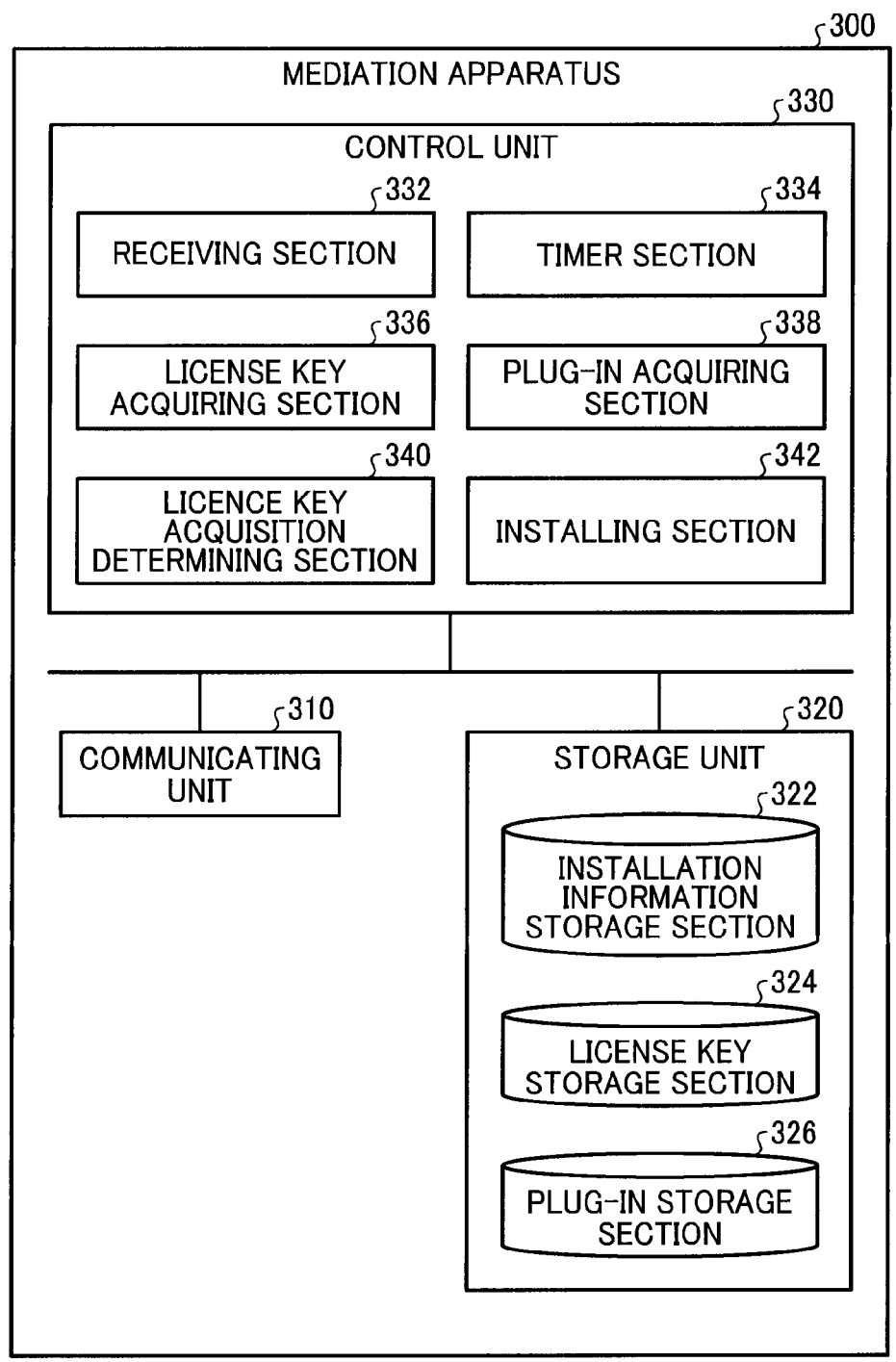
FIG. 2 is a block diagram of an exemplary functional structure of a mediation apparatus according to the embodiment.

FIG. 2 is a block diagram of an exemplary functional structure of the mediation apparatus 300 according to the present embodiment. As illustrated in FIG. 2, the mediation apparatus 300 includes a communicating unit 310, a storage unit 320, and a control unit 330.

The communicating unit 310 communicates with the MFPs 200-1 and 200-2 via the internal network 20, and communicates with the management apparatus 400, the license server 500, and the plug-in server 600 via the internal network 20, the firewall 100, and the external network 30. The communicating unit 310 can be realized by an existing communication device such as a Network Interface Card (NIC), for example.

The storage unit 320 stores therein various types of computer programs executed by the mediation apparatus 300, various types of information used for processing performed by the mediation apparatus 300, or the like. The storage unit 320 can be realized, for example, by an existing storage device that is storable magnetically, optically, or electrically, such as a hard disk drive (HDD), a solid state drive (SSD), a memory card, an optical disk, a read only-memory (ROM), and a random access memory (RAM). The storage unit 320 includes an installation information storage section 322, a license key storage section 324, and a plug-in storage section 326 (an example of a software storage section). These storage sections will be described later.

The control unit 330 controls the units and the sections of the mediation apparatus 300, and can be realized by an existing control device such as a central processing unit (CPU). The control unit 330 includes a receiving section 332, a timer section 334, a license key acquiring section 336, a plug-in acquiring section 338 (an example of a software acquiring section), a license key acquisition determining section 340, and an installing section 342.

The receiving section 332 receives an installation request from the management apparatus 400 that requests the MFP 200 to install therein a plug-in. The installation request according to the present embodiment includes a device ID (an example of an apparatus ID) used for identifying an MFP, a plug-in ID (an example of a software ID) used for identifying a plug-in to be installed in the MFP, a license validation date and time when the license of the plug-in is validated, and a license invalidation date and time when the license of the plug-in is invalidated. However, the information included in the installation request is not limited thereto. The receiving section 332 then stores the received installation request in the installation information storage section 322 as installation information.

FIG. 3 is a schematic of an example of installation information stored in the installation information storage section 322. In the example illustrated in FIG. 3, the installation information storage section 322 stores therein a plurality of pieces of installation information in which device IDs, plug-in IDs, license validation dates and time, and license invalidation dates and time are associated with each other. The device IDs for the MFPs 200-1 and 200-2 herein are assumed to be 101 and 102, respectively.

Referring back to FIG. 2, the timer section 334 measures dates and time. The timer section 334, for example, acquires a current date and time from hardware such as a real-time clock (RTC) at startup of the mediation apparatus 300, and starts the measurement of time.

The license key acquiring section 336 requests temporary issue of a license key of a plug-in from the license server 500 prior to a validation date and time and acquires the license key. The license key acquiring section 336 then stores the license key in the license key storage section 324. More specifically, the license key acquiring section 336 monitors dates and time measured by the timer section 334, controls the communicating unit 310 prior to the license validation date and time included in the installation information, and sends the device ID and the plug-in ID associated with the license validation date and time to the license server 500. Thus, the license key acquiring section 336 requests temporary issue of the license key from the license server 500. The license key acquiring section 336 then receives the temporarily issued license key corresponding to the sent device ID and the sent plug-in ID from the license server 500 via the communicating unit 310. Subsequently, the license key acquiring section 336 stores the device ID and the plug-in ID thus sent, and the received license key in a state of being associated with each other in the license key storage section 324. FIG. 4 is a schematic of an example of information stored in the license key storage section 324.

If the license key acquisition determining section 340, which will be described later, determines that a license key of a plug-in can be acquired from the license server 500 after an validation date and time, the license key acquiring section 336 requests formal issue of the license key from the license server 500, and acquires the license key. More specifically, if the license key acquisition determining section 340 determines that the license key can be acquired, the license key acquiring section 336 controls the communicating unit 310, sends the device ID and the plug-in ID associated with the license validation date and time to the license server 500, and requests formal issue of the license key from the license server 500. The license key acquiring section 336 then receives the formally issued license key corresponding to the sent device ID and the sent plug-in ID from the license server 500 via the communicating unit 310.

Figure 5:
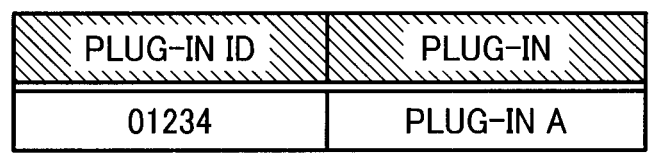
FIG. 5 is a schematic of an example of information stored in a plug-in storage section.

The plug-in acquiring section 338 requests distribution of a plug-in from the plug-in server 600 prior to a validation date and time and acquires the plug-in. The plug-in acquiring section 338 then stores the plug-in in the plug-in storage section 326. More specifically, the plug-in acquiring section 338 monitors dates and time measured by the timer section 334, controls the communicating unit 310 before the license validation date and time included in the installation information has passed, and sends the plug-in ID associated with the license activation date and time to the plug-in server 600. Thus, the plug-in acquiring section 338 requests distribution of the plug-in from the plug-in server 600. The plug-in acquiring section 338 then receives the plug-in corresponding to the sent plug-in ID from the plug-in server 600 via the communicating unit 310. Subsequently, the plug-in acquiring section 338 stores the sent plug-in ID and the received plug-in in a state of being associated with each other in the plug-in storage section 326. FIG. 5 is a schematic of an example of information stored in the plug-in storage section 326.

The license key acquisition determining section 340 determines whether a license key of a plug-in can be acquired from the license server 500 at a validation date and time. More specifically, the license key acquisition determining section 340 monitors dates and time measured by the timer section 334, confirms the availability of communications with the license server 500 when the activation date and time included in the installation information has passed, and determines whether the license key can be acquired.

If the license key acquisition determining section 340 determines that the license key cannot be acquired, the installing section 342 causes the MFP 200 to install therein the plug-in by using the license key stored in the license key storage section 324 and the plug-in stored in the plug-in storage section 326. More specifically, the installing section 342 acquires, from the license key storage section 324, the license key associated with the device ID and the plug-in ID corresponding to the device ID and the plug-in ID associated with the passing license activation date and time. The installing unit 342 also acquires the plug-in associated with the plug-in ID from the plug-in storage section 326. Subsequently, the installing unit 342 controls the communicating unit 310, sends the license key acquired from the license key storage section 324 and the plug-in acquired from the plug-in storage section 326 to the MFP 200 that is indicated by the device ID associated with the passing license validation date and time, and causes the MFP 200 to install therein the plug-in.

If the license key acquisition determining section 340 determines that the license key can be acquired, the installing unit 342 causes the MFP 200 to install therein the plug-in by using the formally issued license key acquired by the license key acquiring section 336 and the plug-in stored in the plug-in storage section 326. More specifically, the installing unit 342 acquires from the plug-in storage section 326, the plug-in associated with the plug-in ID corresponding to the plug-in ID associated with the passing license validation date and time. Subsequently, the installing unit 342 controls the communicating unit 310, sends the formally issued license key acquired by the license key acquiring section 336 and the plug-in acquired from the plug-in storage section 326 to the MFP 200 that is indicated by the device ID associated with the passing license validation date and time, and causes the MFP 200 to install therein the plug-in.

In the present embodiment, the installation of the plug-in may be installation (addition) of a plug-in that is not installed in the MFP 200, or an update (upgrade) of a plug-in already installed in the MFP 200.

The mediation apparatus 300 need not have a structure including all of the units and the sections described above, and may be configured with a part thereof omitted.

Figure 6:
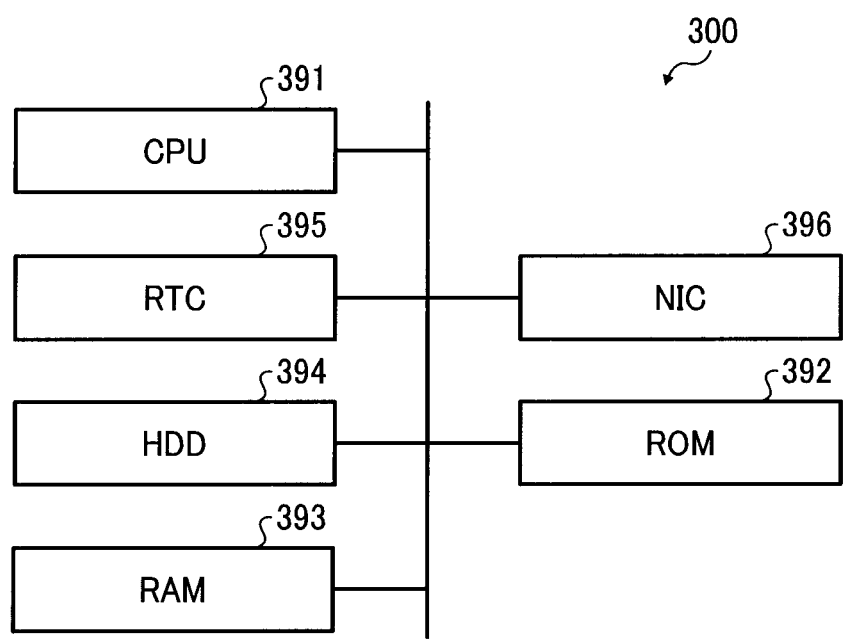
FIG. 6 is a block diagram of an exemplary hardware configuration of the mediation apparatus according to the embodiment.

FIG. 6 is a block diagram of an exemplary hardware configuration of the mediation apparatus 300 according to the present embodiment. As illustrated in FIG. 6, the mediation apparatus 300 has a hardware configuration including a control device such as a CPU 391, storage devices such as a ROM 392 and a RAM 393, an external storage device such as an HDD 394, an internal clock such as an RTC 395, and a communication device such as an NIC 396.

The installation program executed by the mediation apparatus 300 according to the present embodiment is provided in a state of being stored in a computer-readable storage medium such as a compact disk read-only memory (CD-ROM), a compact disk-recordable (CD-R), a memory card, a digital versatile disk (DVD), and a flexible disk (FD) as a file in an installable or an executable format.

The installation program executed by the mediation apparatus 300 according to the present embodiment may be stored in a computer connected to a network such as the Internet, and be provided by being downloaded via the network. The installation program executed by the mediation apparatus 300 according to the present embodiment may also be provided or distributed over a network such as the Internet. Furthermore, the installation program executed by the mediation apparatus 300 according to the present embodiment may be provided in a state of being incorporated in a ROM or the like in advance.

The installation program executed by the mediation apparatus 300 according to the present embodiment has a module structure for realizing the units and the sections described above on the computer. The CPU, as actual hardware, reads out the installation program on the RAM from the HDD and executes the program, thereby realizing the units and the sections described above on the computer.

Referring back to FIG. 1, the management apparatus 400 manages the MFPs 200-1 and 200-2 via the mediation apparatus 300. The management apparatus 400 communicates with the mediation apparatus 300 via the external network 30, the firewall 100, and the internal network 20. Thus, the management apparatus 400 sends a request required for managing the MFP 200 to the mediation apparatus 300, and receives a notice of a counter value, a failure notification or the like of the MFP 200 from the mediation apparatus 300.

The management apparatus 400 stores therein an installation management table that manages installation of a plug-in in the MFP 200. FIG. 7 is a schematic of an example of the installation management table. In the example illustrated in FIG. 7, the installation management table is a table in which mediation apparatus IDs used for identifying mediation apparatuses, device IDs, plug-in IDs, license validation dates and time, and license invalidation dates and time are associated with each other. The mediation apparatus ID of the mediation apparatus 300 herein is assumed to be 200. The management apparatus 400 sends a request for installation of a plug-in to the mediation apparatus 300 based on the installation management table. More specifically, the management apparatus 400 sends an installation request including the device IDs, the plug-in IDs, the license validation dates and time, and the license invalidation dates and time associated with the mediation apparatus ID "200" indicating the mediation apparatus 300 to the mediation apparatus 300.

Figure 8:
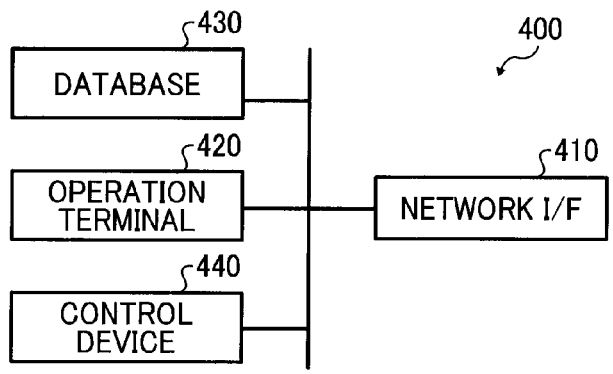
FIG. 8 is a block diagram of an exemplary hardware configuration of a management apparatus according to the embodiment.

FIG. 8 is a block diagram of an exemplary hardware configuration of the management apparatus 400 according to the present embodiment. As illustrated in FIG. 8, the management apparatus 400 includes a network interface (I/F) 410, an operation terminal 420, a database 430, and a control device 440.

The network I/F 410 is a communication device for communicating with other apparatuses such as the mediation apparatus 300. The operation terminal 420 is an input device for an operator to perform various types of operational inputs. The database 430 stores therein various types of parameters, such as the installation management table, used for managing the MFP 200, a management program executed by the management apparatus 400, data input from the operation terminal 420 or the like. The database 430 can be realized by an HDD, for example. The control device 440 controls the whole of the management apparatus 400, and can be realized by a microcomputer including a CPU, a ROM, and a RAM (none of which is illustrated).

Referring back to FIG. 2, the license server 500 receives a request for temporary issue or formal issue of a license key from the mediation apparatus 300, and issues the license key temporarily or formally. More specifically, when receiving a request for temporary issue including a device ID and a plug-in ID from the mediation apparatus 300, the license server 500 generates a license key corresponding to the device ID and the plug-in ID thus received, and issues the license key to the mediation apparatus 300 temporarily. In the same manner, when receiving a request for formal issue including a device ID and a plug-in ID from the mediation apparatus 300, the license server 500 generates a license key corresponding to the device ID and the plug-in ID thus received, and issues the license key to the mediation apparatus 300 formally.

Figure 9:
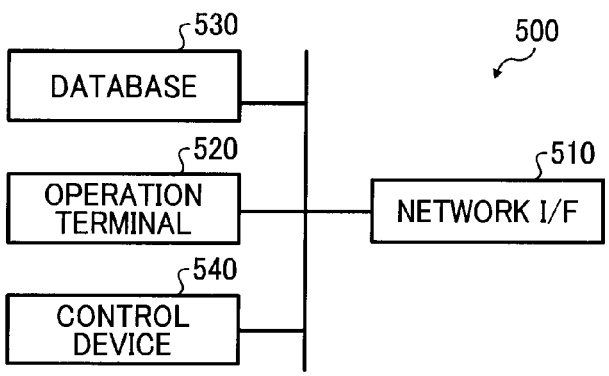
FIG. 9 is a block diagram of an exemplary hardware configuration of a license server according to the embodiment.

FIG. 9 is a block diagram of an exemplary hardware configuration of the license server 500 according to the present embodiment. As illustrated in FIG. 9, the license server 500 includes a network I/F 510, an operation terminal 520, a database 530, and a control device 540.

The network I/F 510 is a communication device for communicating with other apparatuses such as the mediation apparatus 300. The operation terminal 520 is an input device for an operator to perform various types of operational inputs. The database 530 stores therein various types of parameters used for managing a license of a plug-in, computer programs executed by the license server 500, data input from the operation terminal 520, license purchase information sent from the mediation apparatus 300 or the like. The database 530 can be realized by an HDD, for example. The control device 540 controls the whole of the license server 500, and can be realized by a microcomputer including a CPU, a ROM, and a RAM (none of which is illustrated).

Referring back to FIG. 1, the plug-in server 600, which stores therein various types of plug-ins, receives a request for distribution of a plug-in from the mediation apparatus 300, and distributes the plug-in requested to be distributed. More specifically, when receiving a distribution request including a plug-in ID from the mediation apparatus 300, the plug-in server 600 acquires the plug-in corresponding to the received plug-in ID, and distributes the plug-in to the mediation apparatus 300.

Figure 10:
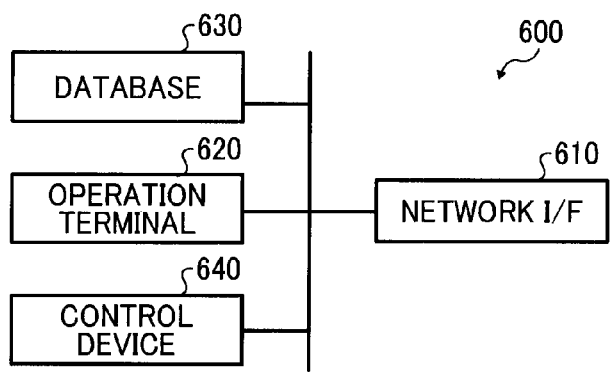
FIG. 10 is a block diagram of an exemplary hardware configuration of a plug-in server according to the embodiment.

FIG. 10 is a block diagram of an exemplary hardware configuration of the plug-in server 600 according to the present embodiment. As illustrated in FIG. 10, the plug-in server 600 includes a network I/F 610, an operation terminal 620, a database 630, and a control device 640.

The network I/F 610 is a communication device for communicating with other apparatuses such as the mediation apparatus 300. The operation terminal 620 is an input device for an operator to perform various types of operational inputs. The database 630 stores therein various types of parameters used for managing a plug-in, computer programs executed by the plug-in server 600, data input from the operation terminal 620, plug-ins themselves or the like. The database 630 can be realized by an HDD, for example. The control device 640 controls the whole of the plug-in server 600, and can be realized by a microcomputer including a CPU, a ROM, and a RAM (none of which is illustrated).

In the present embodiment, the firewall 100 is provided between the external network 30 and the internal network 20. Therefore, the management apparatus 400 sends an installation request to the mediation apparatus 300, the license server 500 issues a license key to the mediation apparatus 300, and the plug-in server 600 distributes a plug-in to the mediation apparatus 300, each by using HyperText Transfer Protocol (HTTP) responses to the polling performed by the mediation apparatus 300 regularly. Accordingly, the installation request to the mediation apparatus 300, the issue of the license key to the mediation apparatus 300, and the distribution of the plug-in to the mediation apparatus 300 can be prevented from being blocked by the firewall 100.

The structure of the installation system according to the present embodiment will now be described.

Figure 11B:
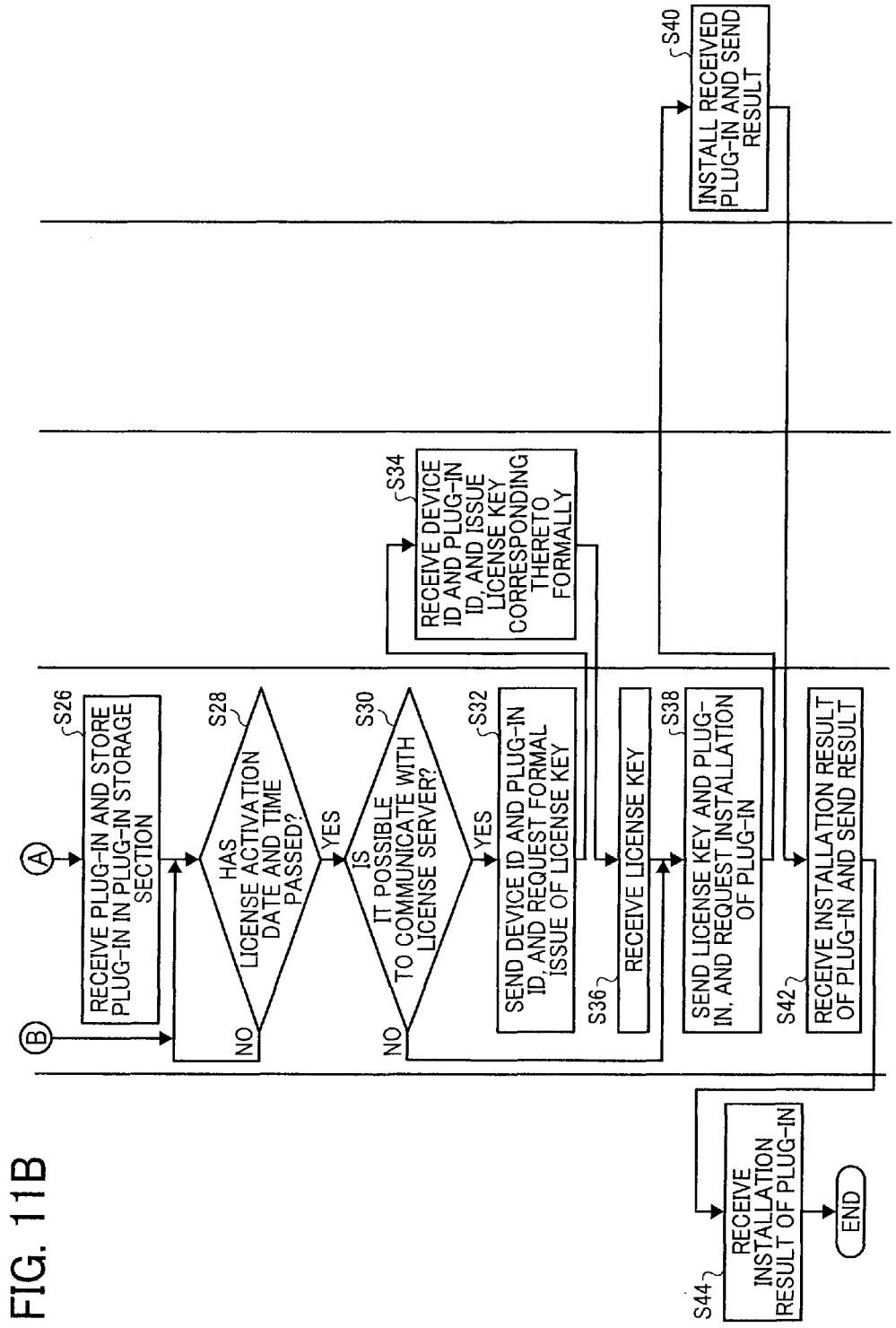
FIG. 11B is a flowchart illustrating the example of installation processing performed by the installation system according to the embodiment.

FIG. 11A and FIG. 11B are flowcharts illustrating an example of installation processing performed by the installation system 10 according to the present embodiment.

The management apparatus 400 sends a request for installation of a plug-in to the mediation apparatus 300 based on the installation management table (Step S10). For example, the management apparatus 400 sends to the mediation apparatus 300 an installation request including the device IDs, the plug-in IDs, the license validation dates and time, and the license invalidation dates and time associated with the mediation apparatus ID "200" indicating the mediation apparatus 300, based on the installation management table illustrated in FIG. 7.

The receiving section 332 of the mediation apparatus 300 then receives the installation request from the management apparatus 400, and stores the received installation request in the installation information storage section 322 as installation information (Step S12). For example, the installation information storage section 322 stores therein the installation information illustrated in FIG. 3.

The license key acquiring section 336 of the mediation apparatus 300 then confirms whether the license key corresponding to the device ID and the plug-in ID included in the installation information (installation request received by the receiving section 332) has already been stored in the license key storage section 324 (Step S14). For example, the installation information storage section 322 is assumed to store therein the installation information illustrated in FIG. 3, and the license key storage section 324 is assumed to store therein the information illustrated in FIG. 4. In this case, the license key storage section 324 already stores therein "license key 1" corresponding to the device ID "101" and the plug-in ID "01234", and "license key 2" corresponding to the device ID "102" and the plug-in ID "01234". However, the license key storage section 324 does not store therein a license key corresponding to the device ID "101" and the plug-in ID "56789" yet.

If a license key that is not stored in the license key storage section 324 yet is present (NO at Step S14), the license key acquiring section 336 sends the device ID and the plug-in ID having no corresponding license key to the license server 500, and requests temporary issue of a license key from the license server 500 (Step S16). For example, the license key acquiring section 336 sends the device ID "101" and the plug-in ID "56789" to the license server 500, and requests temporary issue of a license key from the license server 500.

The license server 500 then receives the request for the temporary issue including the device ID and the plug-in ID from the mediation apparatus 300, generates a license key corresponding to the device ID and the plug-in ID thus received, and issues the license key to the mediation apparatus 300 temporarily (Step S18).

The license key acquiring section 336 then receives the temporarily issued license key corresponding to the sent device ID and the sent plug-in ID from the license server 500, and stores the device ID and the plug-in ID thus sent, and the received license key in a state of being associated with each other in the license key storage section 324 (Step S20).

The plug-in acquiring section 338 of the mediation apparatus 300 then sends the plug-in ID sent to the license server 500 to the plug-in server 600, and requests distribution of a plug-in from the plug-in server 600 (Step S22). For example, the plug-in acquiring section 338 sends the plug-in ID "56789" to the plug-in server 600, and requests distribution of a plug-in from the plug-in server 600 (Step S22).

The plug-in server 600 then receives the distribution request including the plug-in ID from the mediation apparatus 300, acquires the plug-in corresponding to the received plug-in ID, and distributes the plug-in to the mediation apparatus 300 (Step S24).

The plug-in acquiring section 338 then receives the plug-in corresponding to the sent plug-in ID from the plug-in server 600, and stores the sent plug-in ID and the received plug-in in a state of being associated with each other in the plug-in storage section 326 (Step S26).

At Step S14, if a license key that is not stored in the license key storage section 324 is not present (YES at Step S14), the system control procedure goes on to Step S28.

The license key acquisition determining section 340 of the mediation apparatus 300 then monitors dates and time measured by the timer section 334 to check whether the license validation date and time included in the installation information has passed (NO at Step S28).

If the license validation date and time has passed (YES at Step S28), the license key acquisition determining section 340 confirms whether the communications with the license server 500 can be established, and determines whether the license key can be acquired (Step S30). For example, when the license validation date and time "2009/10/1 0:00" has passed, the license key acquisition determining section 340 confirms the availability of communications with the license server 500, and determines whether the license key can be acquired.

If the license key acquisition determining section 340 determines that the license key can be acquired (the communications with the license server 500 can be established) (YES at Step S30), the license key acquiring section 336 sends the device ID and the plug-in ID associated with the passing license validation date and time to the license server 500, and requests formal issue of the license key from the license server 500 (Step S32). For example, the license key acquiring section 336 sends the device ID "101" and the plug-in ID "56789" to the license server 500, and requests formal issue of the license key from the license server 500.

The license server 500 then receives the request for the formal issue including the device ID and the plug-in ID from the mediation apparatus 300, generates a license key corresponding to the device ID and the plug-in ID thus received, and issues the license key to the mediation apparatus 300 formally (Step S34).

The license key acquiring section 336 then receives the formally issued license key corresponding to the sent device ID and the sent plug-in ID from the license server 500 (Step S36).

At Step S30, if the license key acquisition determining section 340 determines that the license key cannot be acquired (the communications with the license server 500 cannot be established) (NO at Step S30), the system control procedure goes on to Step S38.

The installing unit 342 of the mediation apparatus 300 then sends the license key and the plug-in stored in the plug-in storage section 326 to the MFP 200, and causes the MFP 200 to install therein the sent plug-in (Step S38). For example, the installing unit 342 sends the license key corresponding to the device ID "101" and the plug-in ID "56789" and the plug-in corresponding to the plug-in ID "56789" to the MFP 200-1 indicated by the device ID "101", and causes the MFP 200-1 to install therein the sent plug-in. If the license key acquisition determining section 340 determines that the license key cannot be acquired, the installing section 342 sends the temporarily issued license key stored in the license key storage section 324, whereas if the license key acquisition determining section 340 determines that the license key can be acquired, the installing section 342 sends the formally issued license key acquired by the license key acquiring section 336.

The MFP 200 then receives the license key and the plug-in from the mediation apparatus 300, installs therein the received plug-in by using the received license key, and sends an installation result to the mediation apparatus 300 (Step S40).

The mediation apparatus 300 then receives the installation result of the plug-in from the MFP 200, and sends the installation result to the management apparatus 400 (Step S42).

The management apparatus 400 then receives the installation result of the plug-in from the mediation apparatus 300 (Step S44).

As described above, in the present embodiment, a plug-in to be installed and a license key thereof are acquired in advance, whereby the plug-in to be installed can be installed at a scheduled time even if the license key cannot be acquired from the license server at the scheduled time for the installation. Accordingly, services expected by a user can be provided surely at the scheduled time.

[Modification]

The present invention is not limited to the embodiment described above, and various changes and modifications can be made. For example, the installation request from the management apparatus 400 may further include the priority of software, and the control unit 330 may further include a deleting section that deletes a plug-in having low priority from the plug-in storage section 326 if the storage area in the plug-in storage section 326 is running out. In this manner, if the storage area in the plug-in storage section 326 is running out, a plug-in having low priority is deleted and plug-ins having higher priorities remain, whereby the plug-ins having higher priorities can be installed surely. In the embodiment described above, an example is explained in which a plug-in is installed. However, the present invention is not limited thereto, and can be applied to installation of software such as an application and firmware.

According to the embodiment of the present invention, one of the advantages is that software to be installed can be installed at a scheduled time even if a failure occurs in a server or a network.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An installation method executed by a mediation apparatus connected, via a network, to an image forming apparatus, a management apparatus that manages installation of software in the image forming apparatus, a license server that issues a license key of the software, and a software sever that distributes the software, the installation method comprising:

receiving, by a receiving unit, an installation request including an validation date and time when a license of the software is validated from the management apparatus to store the installation request in an installation information storage unit;

acquiring, by a license key acquiring unit, the license key by requesting temporary issue thereof from the license server prior to the validation date and time to store the license key in a license key storage unit;

acquiring, by a software acquiring unit, the software by requesting distribution thereof from the software server prior to the validation date and time to store the software in a software storage unit;

determining, by a license key acquisition determining unit, whether the license key is acquirable from the license server at the time when the validation date and time has passed; and installing, by an installing unit, the software in the image forming apparatus by using the license key stored in the license key storage unit and the software stored in the software storage unit when it is determined that the license key is not acquirable, wherein the acquiring, by the license key acquiring unit, includes acquiring the license key by requesting formal issue thereof from the license server when the license key acquisition determining unit determines that the license key is acquirable, and the installing, by the installing unit, includes installing the software in the image forming apparatus by using the license key thus acquired and the software stored in the software storage unit.

2. A mediation apparatus connected, via a network, to an image forming apparatus, a management apparatus that manages installation of software in the image forming apparatus, a license server that issues a license key of the software, and a software sever that distributes the software, the mediation apparatus comprising:

a processor including:

a receiving unit that receives, from the management apparatus, an installation request including a validation date and time when a license of the software is validated, and stores the installation request in an installation information storage unit;

a license key acquiring unit that acquires the license key by requesting temporary issue thereof from the license server prior to the validation date and time, and stores the license key in a license key storage unit;

a software acquiring unit that acquires the software by requesting distribution thereof from the software server prior to the validation date and time, and stores the software in a software storage unit;

a license key acquisition determining unit that determines whether the license key is acquirable from the license server at the time when the validation date and time has passed; and an installing unit that causes the image forming apparatus to install therein the software by using the license key stored in the license key storage unit and the software stored in the software storage unit when it is determined that the license key is not acquirable, wherein the license key acquiring unit acquires the license key by requesting formal issue thereof from the license server when the license key acquisition determining unit determines that the license key is acquirable, and the installing unit causes the image forming apparatus to install therein the software by using the license key thus acquired and the software stored in the software storage unit.

3. The mediation apparatus according to claim 2, wherein the installation request further comprises an apparatus ID used for identifying the image forming apparatus and a software ID used for identifying the software, the license key acquiring unit sends the apparatus ID and the software ID to the license server prior to the validation date and time to request temporary issue from the license server, and acquires the license key corresponding to the apparatus ID and the software ID thus sent, and the software acquiring unit sends the software ID to the software server prior to the validation date and time to request distribution from the software server, and acquires the software corresponding to the software ID thus sent.

4. The mediation apparatus according to claim 2, wherein the installation request further comprises an apparatus ID used for identifying the image forming apparatus and a software ID used for identifying the software, and the license key acquiring unit sends the apparatus ID and the software ID to the license server to request formal issue from the license server, and acquires the license key corresponding to the apparatus ID and the software ID thus sent when the license key acquisition determining unit determines that the license key is acquirable.

5. The mediation apparatus according to claim 2, wherein the license key acquisition determining unit determines whether the license key is acquirable based on availability of communications with the license server at the time when the validation date and time has passed.

6. The mediation apparatus according to claim 2, wherein the installation request further comprises a priority of the software, and the mediation apparatus further comprising a deleting unit that deletes software having a low priority from the software storage unit when a storage area in the software storage unit is running out.

7. The mediation apparatus according to claim 2, wherein the software is a plug-in.

8. An installation system comprising:

the mediation apparatus according to claim 2;

the management apparatus that sends the installation request to the mediation apparatus;

the license server that issues the license key temporarily to the mediation apparatus;

the software server that distributes the software to the mediation apparatus; and the image forming apparatus that receives the license key and the software from the mediation apparatus, and installs therein the software.

9. A computer program product having a non-transitory computer readable medium that stores a program including instructions for causing a computer to execute an installation by a mediation apparatus connected, via a network, to an image forming apparatus, a management apparatus that manages installation of software in the image forming apparatus, a license server that issues a license key of the software, and a software sever that distributes the software, the instructions comprising:

receiving, by a receiving unit, an installation request including an validation date and time when a license of the software is validated from the management apparatus to store the installation request in an installation information storage unit;

acquiring, by a license key acquiring unit, the license key by requesting temporary issue thereof from the license server prior to the validation date and time to store the license key in a license key storage unit;

acquiring, by a software acquiring unit, the software by requesting distribution thereof from the software server prior to the validation date and time to store the software in a software storage unit;

determining, by a license key acquisition determining unit, whether the license key is acquirable from the license server at the time when the validation date and time has passed; and installing, by an installing unit, the software in the image forming apparatus by using the license key stored in the license key storage unit and the software stored in the software storage unit when it is determined that the license key is not acquirable, wherein the acquiring, by the license key acquiring unit, includes acquiring the license key by requesting formal issue thereof from the license server when the license key acquisition determining unit determines that the license key is acquirable, and the installing, by the installing unit, includes installing the software in the image forming apparatus by using the license key thus acquired and the software stored in the software storage unit.

\* \* \* \* \*